United States Patent
Jang et al.

(10) Patent No.: US 12,461,814 B2
(45) Date of Patent: Nov. 4, 2025

(54) MEMORY INCLUDING ERROR CORRECTION CODE ENGINE

(71) Applicant: SK hynix Inc., Gyeonggi-do (KR)

(72) Inventors: Mun Seon Jang, Gyeonggi-do (KR); Sang Uhn Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/442,555

(22) Filed: Feb. 15, 2024

(65) Prior Publication Data

US 2025/0173217 A1    May 29, 2025

(30) Foreign Application Priority Data

Nov. 24, 2023  (KR) .......................... 10-2023-0165898

(51) Int. Cl.
*G06F 11/10* (2006.01)

(52) U.S. Cl.
CPC ...... *G06F 11/1068* (2013.01); *G06F 11/1004* (2013.01); *G06F 11/1016* (2013.01)

(58) Field of Classification Search
None
See application file for complete search history.

(56) References Cited

U.S. PATENT DOCUMENTS

| | | | |
|---|---|---|---|
| 4,509,172 A * | 4/1985 | Chen ................... | G06F 11/1028 714/759 |
| 10,176,040 B2 * | 1/2019 | Kreifels ................ | H03M 13/19 |
| 2010/0257432 A1 * | 10/2010 | Resnick ................ | H03M 13/19 714/752 |
| 2020/0210284 A1 * | 7/2020 | Somasekhar ....... | G06F 11/1012 |
| 2020/0327952 A1 * | 10/2020 | Chung .................. | G11C 29/52 |
| 2023/0037996 A1 * | 2/2023 | Kim ..................... | G06F 11/1012 |
| 2024/0184670 A1 * | 6/2024 | Sullivan .............. | G06F 11/1048 |
| 2025/0045154 A1 * | 2/2025 | Gupta ................. | G06F 11/1016 |
| 2025/0045155 A1 * | 2/2025 | Gupta ................. | G06F 11/1044 |

FOREIGN PATENT DOCUMENTS

KR    20040090410 A    10/2004

OTHER PUBLICATIONS

N. Sridevi, K. Jamal and K. Mannem, "Implementation of Error Correction Techniques in Memory Applications," 2021 5th International Conference on Computing Methodologies and Communication (ICCMC), Erode, India, 2021, pp. 586-595, (Year: 2021).*

* cited by examiner

*Primary Examiner* — Daniel F. McMahon
(74) *Attorney, Agent, or Firm* — IP & T GROUP LLP

(57) ABSTRACT

A memory includes a memory core, an error correction code (ECC) engine, and an error determination circuit. The ECC engine is configured to generate an error correction code to be stored in the memory core together with write data by using the write data during an encoding operation, and to correct an error of read data read from the memory core using the error correction code read from the memory core during a decoding operation. The error determination circuit is configured to determine that, during the decoding operation, a 1-bit error exists when upper index portions of syndromes generated by the ECC engine have odd weights, and to determine that a correctable 2-bit error exists when the upper index portions of the syndromes are one of predetermined even weight patterns.

16 Claims, 15 Drawing Sheets

FIG. 2

| DATA | | | | | | | | ECC | | | | | | | |
|---|---|---|---|---|---|---|---|---|---|---|---|---|---|---|---|
| D0 | D1 | D2 | D3 | D4 | D5 | D6 | D7 | E0 | E1 | E2 | E3 | E4 | E5 | E6 | E7 |
| 1 | 0 | 1 | 0 | 1 | 0 | 1 | 0 | 1 | 0 | 0 | 0 | 0 | 0 | 0 | 0 |
| 0 | 1 | 0 | 1 | 0 | 1 | 0 | 1 | 0 | 1 | 0 | 0 | 0 | 0 | 0 | 0 |
| 1 | 0 | 0 | 1 | 1 | 1 | 1 | 0 | 0 | 0 | 1 | 0 | 0 | 0 | 0 | 0 |
| 0 | 1 | 1 | 1 | 1 | 0 | 0 | 1 | 0 | 0 | 0 | 1 | 0 | 0 | 0 | 0 |
| 1 | 0 | 1 | 1 | 0 | 1 | 0 | 0 | 0 | 0 | 0 | 0 | 1 | 0 | 0 | 0 |
| 0 | 1 | 1 | 0 | 1 | 1 | 0 | 0 | 0 | 0 | 0 | 0 | 0 | 1 | 0 | 0 |
| 0 | 0 | 0 | 0 | 0 | 0 | 1 | 0 | 0 | 0 | 0 | 0 | 0 | 0 | 1 | 0 |
| 0 | 0 | 0 | 0 | 0 | 0 | 0 | 1 | 0 | 0 | 0 | 0 | 0 | 0 | 0 | 1 |

FIG. 3

$$\begin{pmatrix} 1 & 0 & 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 1 & 0 & 0 & 0 & 0 & 0 & 0 \\ 1 & 0 & 0 & 1 & 1 & 1 & 1 & 0 & 0 & 0 & 1 & 0 & 0 & 0 & 0 & 0 \\ 0 & 1 & 1 & 1 & 1 & 0 & 0 & 1 & 0 & 0 & 0 & 1 & 0 & 0 & 0 & 0 \\ 1 & 0 & 1 & 1 & 0 & 1 & 0 & 0 & 0 & 0 & 0 & 0 & 1 & 0 & 0 & 0 \\ 0 & 1 & 1 & 0 & 1 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \end{pmatrix} \times \begin{pmatrix} D0 \\ D1 \\ D2 \\ D3 \\ D4 \\ D5 \\ D6 \\ D7 \\ E0 \\ E1 \\ E2 \\ E3 \\ E4 \\ E5 \\ E6 \\ E7 \end{pmatrix} = \begin{pmatrix} 0 \\ 0 \\ 0 \\ 0 \\ 0 \\ 0 \\ 0 \\ 0 \end{pmatrix}$$

FIG. 4

$$\begin{pmatrix} 1 & 0 & 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 1 & 0 & 0 & 0 & 0 & 0 & 0 \\ 1 & 0 & 0 & 1 & 1 & 1 & 1 & 0 & 0 & 0 & 1 & 0 & 0 & 0 & 0 & 0 \\ 0 & 1 & 1 & 1 & 1 & 0 & 0 & 1 & 0 & 0 & 0 & 1 & 0 & 0 & 0 & 0 \\ 1 & 0 & 1 & 1 & 0 & 1 & 0 & 0 & 0 & 0 & 0 & 0 & 1 & 0 & 0 & 0 \\ 0 & 1 & 1 & 0 & 1 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \end{pmatrix} \times \begin{pmatrix} 1 \\ 1 \\ 0 \\ 0 \\ 1 \\ 0 \\ 1 \\ 0 \\ E0 \\ E1 \\ E2 \\ E3 \\ E4 \\ E5 \\ E6 \\ E7 \end{pmatrix} = \begin{pmatrix} 0 \\ 0 \\ 0 \\ 0 \\ 0 \\ 0 \\ 0 \\ 0 \end{pmatrix}$$

FIG. 5

$$\begin{pmatrix} 1 & 0 & 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 1 & 0 & 0 & 0 & 0 & 0 & 0 \\ 1 & 0 & 0 & 1 & 1 & 1 & 1 & 0 & 0 & 0 & 1 & 0 & 0 & 0 & 0 & 0 \\ 0 & 1 & 1 & 1 & 1 & 0 & 0 & 1 & 0 & 0 & 0 & 1 & 0 & 0 & 0 & 0 \\ 1 & 0 & 1 & 1 & 0 & 1 & 0 & 0 & 0 & 0 & 0 & 0 & 1 & 0 & 0 & 0 \\ 0 & 1 & 1 & 0 & 1 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \end{pmatrix} \times \begin{pmatrix} D0' \\ D1' \\ D2' \\ D3' \\ D4' \\ D5' \\ D6' \\ D7' \\ E0 \\ E1 \\ E2 \\ E3 \\ E4 \\ E5 \\ E6 \\ E7 \end{pmatrix} = \begin{pmatrix} S0 \\ S1 \\ S2 \\ S3 \\ S4 \\ S5 \\ S6 \\ S7 \end{pmatrix}$$

FIG. 6

$$\begin{pmatrix} 1 & 0 & 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 1 & 0 & 0 & 0 & 0 & 0 & 0 \\ 1 & 0 & 0 & 1 & 1 & 1 & 1 & 0 & 0 & 0 & 1 & 0 & 0 & 0 & 0 & 0 \\ 0 & 1 & 1 & 1 & 1 & 0 & 0 & 1 & 0 & 0 & 0 & 1 & 0 & 0 & 0 & 0 \\ 1 & 0 & 1 & 1 & 0 & 1 & 0 & 0 & 0 & 0 & 0 & 0 & 1 & 0 & 0 & 0 \\ 0 & 1 & 1 & 0 & 1 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \end{pmatrix} \times \begin{pmatrix} 1 \\ 1 \\ 0 \\ 0 \\ 1 \\ 0 \\ 1 \\ 0 \\ 1 \\ 0 \\ 1 \\ 1 \\ 1 \\ 0 \\ 1 \\ 0 \end{pmatrix} = \begin{pmatrix} 0 \\ 0 \\ 0 \\ 0 \\ 0 \\ 0 \\ 0 \\ 0 \end{pmatrix}$$

FIG. 7

$$\begin{pmatrix} 1 & 0 & 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 1 & 0 & 0 & 0 & 0 & 0 & 0 \\ 1 & 0 & 0 & 1 & 1 & 1 & 1 & 0 & 0 & 0 & 1 & 0 & 0 & 0 & 0 & 0 \\ 0 & 1 & 1 & 1 & 1 & 0 & 0 & 1 & 0 & 0 & 0 & 1 & 0 & 0 & 0 & 0 \\ 1 & 0 & 1 & 1 & 0 & 1 & 0 & 0 & 0 & 0 & 0 & 0 & 1 & 0 & 0 & 0 \\ 0 & 1 & 1 & 0 & 1 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \end{pmatrix} \times \begin{pmatrix} 1 \\ 1 \\ 0 \\ 0 \\ 1 \\ 0 \\ 0 \\ 0 \\ 1 \\ 1 \\ 1 \\ 0 \\ 1 \\ 0 \\ 1 \\ 0 \end{pmatrix} = \begin{pmatrix} 1 \\ 0 \\ 1 \\ 0 \\ 0 \\ 0 \\ 1 \\ 0 \end{pmatrix}$$

FIG. 11

| S0 | S1 | S2 | S3 | DETERMINATION | ERR_INF |
|---|---|---|---|---|---|
| 0 | 0 | 0 | 0 | No Error | NE |
| odd weight | | | | 1bit Error | CE |
| 0 | 0 | 1 | 1 | 2bit correctable Error | CE |
| 1 | 1 | 0 | 0 | | |
| 0 | 1 | 0 | 1 | | |
| 1 | 0 | 1 | 0 | | |
| other cases | | | | Uncorrectable Error | UE |

FIG. 14

| S0 | S1 | S2 | S3 | S4 | S5 | S6 | S7 | DETERMINATION | ERR_INF |
|---|---|---|---|---|---|---|---|---|---|
| 0 | 0 | 0 | 0 | 0 | 0 | 0 | 0 | No Error | NE |
| odd weight | | | | don't care | | | | 1bit Error | CE |
| 0 | 0 | 0 | 0 | 1 | 0 | 1 | 0 | | |
| 0 | 0 | 0 | 0 | 0 | 1 | 0 | 1 | | |
| 0 | 0 | 0 | 0 | 1 | 1 | 1 | 0 | | |
| 0 | 0 | 0 | 0 | 0 | 1 | 1 | 1 | | |
| 0 | 0 | 1 | 1 | don't care | | | | 2bit correctable Error | |
| 1 | 1 | 0 | 0 | | | | | | |
| 0 | 1 | 0 | 1 | | | | | | |
| 1 | 0 | 1 | 0 | | | | | | |
| 0 | 0 | 0 | 0 | 1 | 1 | 1 | 1 | | |
| 0 | 0 | 0 | 0 | 1 | 0 | 0 | 1 | | |
| other cases | | | | | | | | Uncorrectable Error | UE |

MEMORY INCLUDING ERROR CORRECTION CODE ENGINE

CROSS-REFERENCE TO RELATED APPLICATION

This application claims priority under 35 U.S.C. § 119 (a) to Korean Patent Application No. 10-2023-0165898 filed on Nov. 24, 2023, which is incorporated herein by reference in its entirety.

BACKGROUND

1. Technical Field

Embodiments of the present disclosure relate to a memory.

2. Related Art

In the early days of a semiconductor memory industry, a plurality of original good memory dies having no defective memory cells in a memory chip having passed through a semiconductor manufacturing process were distributed on a wafer. However, as the capacity of a memory gradually increases, it has become difficult to produce a memory having no defective memory cells. At the present time, there is no probability that such a memory will be manufactured. As a way to overcome such a situation, a method of repairing defective memory cells of a memory with redundancy memory cells is used.

As another way, an error occurring in a memory cell is corrected using an error correction code (ECC) engine that corrects an error in the memory.

SUMMARY

In an embodiment of the present disclosure, a memory may include: a memory core; an error correction code (ECC) engine configured to generate an error correction code to be stored in the memory core together with write data by using the write data during an encoding operation, and to correct an error of read data read from the memory core using the error correction code read from the memory core during a decoding operation; and an error determination circuit configured to determine that during the decoding operation, a 1-bit error exists when upper index portions of syndromes generated by the ECC engine have odd weights, and to determine that a correctable 2-bit error exists when the upper index portions of the syndromes are one of predetermined even weight patterns.

In an embodiment of the present disclosure, a memory may include: a memory core; an error correction code (ECC) engine configured to generate an error correction code to be stored in the memory core together with write data by using the write data during an encoding operation, and to correct an error of read data read from the memory core using the error correction code read from the memory core during a decoding operation; and an error determination circuit configured to determine that during the decoding operation, a 1-bit error exists when upper index portions of syndromes generated by the ECC engine have odd weights, and to determine that a 1-bit error exists when the upper index portions of the syndromes have specific even weights and lower index portions coincide with one of predetermined first patterns.

During the decoding operation, the error determination circuit determines that a correctable 2-bit error exists when the upper index portions of the syndromes have even weights coinciding with one of predetermined second patterns, and determines that a correctable 2-bit error exists when the upper index portions of the syndromes are a predetermined third pattern and the lower index portions coincide with one of predetermined fourth patterns.

In an embodiment of the present disclosure, a memory may include: a memory core; an error correction code (ECC) engine configured to perform an encoding operation and a decoding operation; and an error determination circuit, wherein the ECC engine is configured to: during the encoding operation, receive write data; generate an error correction code using the write data; and provide the memory core with the write data and the error correction code for storing, during the decoding operation, read, from the memory core, read data and the error correction code; decode the read data using the error correction code; and generate syndrome values for the decoded read data, the syndrome values including an upper portion and a lower portion, and wherein the error determination circuit is configured to: determine whether the decoded read data includes a 1-bit error or a 2-bit error, based on a combination of bit patterns and bit weights of the upper and lower portions of the syndrome values.

BRIEF DESCRIPTION OF THE DRAWINGS

FIG. 2 is a diagram illustrating a check matrix used by an error correction code encoder and an error correction code decoder in accordance with an embodiment of the present disclosure.

FIG. 3 is a diagram expressing Equation 1 to Equation 8 by using matrix operations in accordance with an embodiment of the present disclosure.

FIG. 4 is a diagram illustrating a process in which the error correction code encoder generates an error correction code ECC for data DATA (1,1,0,0,1,0,1,0) by using the check matrix in FIG. 2 in accordance with an embodiment of the present disclosure.

FIG. 5 is a diagram illustrating a process in which the error correction code decoder generates syndromes S0 to S7 for error correction in accordance with an embodiment of the present disclosure.

FIG. 6 is a diagram illustrating how the error correction code decoder generates the syndromes S0 to S7 when data DATA' has no error in accordance with an embodiment of the present disclosure.

FIG. 7 is a diagram illustrating how the error correction code decoder generates the syndromes S0 to S7 when the data DATA' has an error in accordance with an embodiment of the present disclosure.

FIG. 11 is a diagram illustrating an operation of an error determination circuit in FIG. 8 when the ECC engine uses the check matrix in FIG. 9 in accordance with an embodiment of the present disclosure.

FIG. 14 is a diagram illustrating an operation of the error determination circuit in FIG. 8 when the ECC engine uses the check matrix in FIG. 12 in accordance with an embodiment of the present disclosure.

DETAILED DESCRIPTION

Various embodiments of the present disclosure are directed to providing a technology of determining an error occurring in a memory.

Embodiments of the present disclosure can provide a technology for determining an error occurring in a memory.

Hereafter, embodiments in accordance with the technical spirit of the present disclosure are described with reference to the accompanying drawings.

Figure 1:
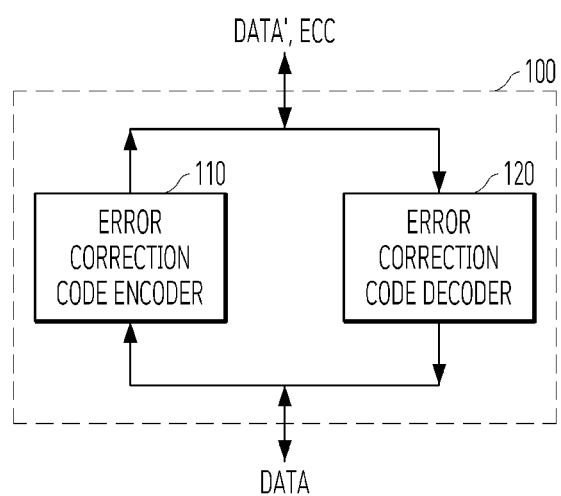
FIG. 1 is a configuration diagram of an ECC engine in accordance with an embodiment of the present disclosure.

FIG. 1 is a configuration diagram of an error correction code (ECC) engine 100 in accordance with an embodiment of the present disclosure.

Referring to FIG. 1, the ECC engine 100 may include an error correction code encoder 110 and an error correction code decoder 120.

The error correction code encoder 110 may generate an error correction code ECC by using data DATA transmitted from the outside of a memory (e.g., a memory controller) during a write operation. That is, the error correction code encoder 110 may encode the data DATA and generate the error correction code ECC for correcting an error in data associated with a read operation. The data DATA to be encoded in the process of generating the error correction code ECC is also referred to as a message. During the write operation, because the error correction code ECC is generated but no error correction operation is performed, the data DATA input to the error correction code encoder 110 and data DATA' output from the error correction code encoder 110 may be the same.

During the write operation, the data DATA' and the error correction code ECC may be stored in a memory core (not illustrated). During a read operation, the data DATA' and the error correction code ECC may be read from the memory core and transmitted to the error correction code decoder 120.

During the read operation, the error correction code decoder 120 may correct an error in the data DATA' by using the error correction code ECC. Correcting the error may mean detecting an error in the data DATA' by using the error correction code ECC and correcting the error when the error is detected. The data DATA whose error has been corrected by the error correction code decoder 120 may be output to the outside of the memory. That is, the data DATA may be transmitted to the memory controller.

FIG. 2 is a diagram illustrating a check matrix used by the error correction code encoder 110 and the error correction code decoder 120 in accordance with an embodiment of the present disclosure. In FIG. 2, the data DATA includes 8 bits D0 to D7 and the error correction code ECC includes 8 bits E0 to E7.

The check matrix may include a matrix of (number of bits of error correction code)×(number of bits of data+number of bits of error correction code). Because the error correction code ECC includes 8 bits and the data DATA includes 8 bits, the check matrix may include an 8×16 matrix. Each element of the check matrix may have a value of one (1) or zero (0).

Column vectors of the check matrix may correspond to the bits D0 to D7 of the data DATA and the bits E0 to E7 of the error correction code ECC. In FIG. 2, it can be seen that D1 corresponds to a column vector with a value of '01010100' and E1 corresponds to '01000000'.

How the error correction code ECC is generated using the check matrix is described below. The error correction code encoder 110 may multiply the column vectors of the check matrix with corresponding bits and then generate the error correction code ECC so that the sum of rows becomes 0 (that is, an even number).

That is, bits E0 to E7 of the error correction code ECC may be generated so that eight Equations below are satisfied.

$$1*D0 + 0*D1 + 1*D2 + 0*D3 + 1*D4 + 0*D5 +$$
$$1*D6 + 0*D7 + 1*E0 + 0*E1 + 0*E2 + 0*E3 +$$
$$0*E4 + 0*E5 + 0*E6 + 0*E7 = 0 \text{ (for the first row)}$$
Equation 1

$$0*D0 + 1*D1 + 0*D2 + 1*D3 + 0*D4 + 1*D5 +$$
$$0*D6 + 1*D7 + 0*E0 + 1*E1 + 0*E2 + 0*E3 +$$
$$0*E4 + 0*E5 + 0*E6 + 0*E7 = 0 \text{ (for the second row)}$$
Equation 2

$$1*D0 + 0*D1 + 0*D2 + 1*D3 + 1*D4 + 1*D5 +$$
$$1*D6 + 0*D7 + 0*E0 + 0*E1 + 1*E2 + 0*E3 +$$
$$0*E4 + 0*E5 + 0*E6 + 0*E7 = 0 \text{ (for the third row)}$$
Equation 3

$$0*D0 + 1*D1 + 1*D2 + 1*D3 + 1*D4 + 0*D5 +$$
$$0*D6 + 1*D7 + 0*E0 + 0*E1 + 0*E2 + 1*E3 +$$
$$0*E4 + 0*E5 + 0*E6 + 0*E7 = 0 \text{ (for the fourth row)}$$
Equation 4

$$1*D0 + 0*D1 + 1*D2 + 1*D3 + 0*D4 + 1*D5 +$$
$$0*D6 + 0*D7 + 0*E0 + 0*E1 + 0*E2 + 0*E3 +$$
$$1*E4 + 0*E5 + 0*E6 + 0*E7 = 0 \text{ (for the fifth row)}$$
Equation 5

$$0*D0 + 1*D1 + 1*D2 + 0*D3 + 1*D4 + 1*D5 +$$
$$0*D6 + 0*D7 + 0*E0 + 0*E1 + 0*E2 + 0*E3 +$$
$$0*E4 + 1*E5 + 0*E6 + 0*E7 = 0 \text{ (for the sixth row)}$$
Equation 6

$$0*D0 + 0*D1 + 0*D2 + 0*D3 + 0*D4 + 0*D5 +$$
$$1*D6 + 0*D7 + 0*E0 + 0*E1 + 0*E2 + 0*E3 +$$
$$0*E4 + 0*E5 + 1*E6 + 0*E7 = 0 \text{ (for the seventh row)}$$
Equation 7

$$0*D0 + 0*D1 + 0*D2 + 0*D3 + 0*D4 + 0*D5 +$$
$$0*D6 + 1*D7 + 0*E0 + 0*E1 + 0*E2 + 0*E3 +$$
$$0*E4 + 0*E5 + 0*E6 + 1*E7 = 0 \text{ (for the eighth row)}$$
Equation 8

An addition in the above equations and the following description means exclusive OR. Therefore, the result of the addition may be 0 when the number of 1's is an even number and may be 1 when the number of 1's is an odd number. For example, 1+1+0+1 may be 1 and 0+1+1+0 may be 0.

FIG. 3 is a diagram expressing Equation 1 to Equation 8 by using matrix operations in accordance with an embodiment of the present disclosure.

Referring to FIG. 3, Equation 1 to Equation 8 below may be expressed as a matrix multiplication of a check matrix of an 8×16 matrix and data DATA (=D0 to D7) and an error correction code ECC(=E0 to E7) of a 16×1 matrix. The error correction code ECC(=E0 to E7) may be generated by such a matrix multiplication operation.

When Equation 1 to Equation 8 below are summarized to obtain the error correction code ECC(=E0 to E7), Equation 1 to Equation 8 may be simply expressed as the following Equation 1-1, Equation 2-1, Equation 3-1, Equation 4-1, Equation 5-1, Equation 6-1, Equation 7-1, and Equation 8-1, respectively.

$$1*D0 + 0*D1 + 1*D2 + \\ 0*D3 + 1*D4 + 0*D5 + 1*D6 + 0*D7 = E0 \quad \text{Equation 1-1}$$

$$0*D0 + 1*D1 + 0*D2 + \\ 1*D3 + 0*D4 + 1*D5 + 0*D6 + 1*D7 = E1 \quad \text{Equation 2-1}$$

$$1*D0 + 0*D1 + 0*D2 + \\ 1*D3 + 1*D4 + 1*D5 + 1*D6 + 0*D7 = E2 \quad \text{Equation 3-1}$$

$$0*D0 + 1*D1 + 1*D2 + \\ 1*D3 + 1*D4 + 0*D5 + 0*D6 + 1*D7 = E3 \quad \text{Equation 4-1}$$

$$1*D0 + 0*D1 + 1*D2 + \\ 1*D3 + 0*D4 + 1*D5 + 0*D6 + 0*D7 = E4 \quad \text{Equation 5-1}$$

$$0*D0 + 1*D1 + 1*D2 + \\ 0*D3 + 1*D4 + 1*D5 + 0*D6 + 0*D7 = E5 \quad \text{Equation 6-1}$$

$$0*D0 + 0*D1 + 0*D2 + \\ 0*D3 + 0*D4 + 0*D5 + 1*D6 + 0*D7 = E6 \quad \text{Equation 7-1}$$

$$0*D0 + 0*D1 + 0*D2 + \\ 0*D3 + 0*D4 + 0*D5 + 0*D6 + 1*D7 = E7 \quad \text{Equation 8-1}$$

FIG. 4 is a diagram illustrating a process in which the error correction code encoder 110 generates the error correction code ECC for data DATA (1,1,0,0,1,0,1,0) by using the check matrix in FIG. 2 in accordance with an embodiment of the present disclosure.

Referring to FIG. 4, it can be seen that (1,1,0,0,1,0,1,0) is put into the place of the data in the matrix multiplication of FIG. 3. When the value of the error correction code ECC (=E0 to E7) satisfying a matrix multiplication equation of FIG. 4 is obtained, the error correction code may be generated as (1,1,1,0,1,0,1,0).

FIG. 5 is a diagram illustrating a process in which the error correction code decoder 120 generates syndromes S0 to S7 for error correction in accordance with an embodiment of the present disclosure.

Referring to FIG. 5, the error correction code decoder 120 may generate the syndromes S0 to S7 by matrix multiplying the check matrix in FIG. 2 by read data DATA' (=D0' to D7')/read error correction code ECC(=E0 to E7). The check matrix in FIG. 2 is the same as that used by the error correction code encoder 110.

The generation of FIG. 5 may be expressed with the following formulas.

$$1*D0' + 0*D1' + 1*D2' + 0*D3' + 1*D4' + \\ 0*D5' + 1*D6' + 0*D7' + 1*E0 + 0*E1 + 0*E2 + 0*E3 + \\ 0*E4 + 0*E5 + 0*E6 + 0*E7 = S0 \text{ (for the first row)}$$

$$0*D0' + 1*D1' + 0*D2' + 1*D3' + 0*D4' + \\ 1*D5' + 0*D6' + 1*D7' + 0*E0 + 0*E1 + 0*E2 + 0*E3 + \\ 0*E4 + 0*E5 + 0*E6 + 0*E7 = S1 \text{ (for the second row)}$$

$$1*D0' + 0*D1' + 0*D2' + 1*D3' + 1*D4' + \\ 1*D5' + 1*D6' + 0*D7' + 0*E0 + 0*E1 + 1*E2 + 0*E3 + \\ 0*E4 + 0*E5 + 0*E6 + 0*E7 = S2 \text{ (for the third row)}$$

$$0*D0' + 1*D1' + 1*D2' + 1*D3' + 1*D4' + \\ 0*D5' + 0*D6' + 1*D7' + 0*E0 + 0*E1 + 0*E2 + 1*E3 + \\ 0*E4 + 0*E5 + 0*E6 + 0*E7 = S3 \text{ (for the fourth row)}$$

$$1*D0' + 0*D1' + 1*D2' + 1*D3' + 0*D4' + \\ 1*D5' + 0*D6' + 0*D7' + 0*E0 + 0*E1 + 0*E2 + 0*E3 + \\ 1*E4 + 0*E5 + 0*E6 + 0*E7 = S4 \text{ (for the fifth row)}$$

$$0*D0' + 1*D1' + 1*D2' + 0*D3' + 1*D4' + \\ 1*D5' + 0*D6' + 0*D7' + 0*E0 + 0*E1 + 0*E2 + 0*E3 + \\ 0*E4 + 1*E5 + 0*E6 + 0*E7 = S5 \text{ (for the sixth row)}$$

$$0*D0' + 0*D1' + 0*D2' + 0*D3' + 0*D4' + \\ 0*D5' + 1*D6' + 0*D7' + 0*E0 + 0*E1 + 0*E2 + 0*E3 + \\ 0*E4 + 0*E5 + 1*E6 + 0*E7 = S6 \text{ (for the seventh row)}$$

$$0*D0' + 0*D1' + 0*D2' + 0*D3' + 0*D4' + \\ 0*D5' + 0*D6' + 1*D7' + 0*E0 + 0*E1 + 0*E2 + 0*E3 + \\ 0*E4 + 0*E5 + 0*E6 + 1*E7 = S7 \text{ (for the eighth row)}$$

FIG. 6 is a diagram illustrating how the error correction code decoder 120 generates the syndromes S0 to S7 when data DATA' has no error in accordance with an embodiment of the present disclosure. In FIG. 6, the data (1,1,0,0,1,0,1,0) illustrated in FIG. 4 and the error correction code (1,1,1,0, 1,0,1,0) were stored in a memory core and then read again as is.

Referring to FIG. 6, it can be seen that the syndromes S0 to S7 are generated as (0,0,0,0,0,0,0,0) by matrix multiplying the check matrix in FIG. 2 by read data DATA' (1,1,0, 0,1,0,1,0)/error correction code ECC (1,1,1,0,1,0,1,0).

The generation of FIG. 6 may be expressed with the following formulas.

$$1*1 + 0*1 + 1*0 + 0*0 + 1*1 + 0*0 + 1*1 + 0*0 + \\ 1*1 + 0*1 + 0*1 + 0*0 + 0*1 + 0*0 + 0*1 + 0*0 = 0$$

$$0*1 + 1*1 + 0*0 + 1*0 + 0*1 + 1*0 + 0*1 + 1*0 + \\ 0*1 + 1*1 + 0*1 + 0*0 + 0*1 + 0*0 + 0*1 + 0*0 = 0$$

$$1*1 + 0*1 + 0*0 + 1*0 + 1*1 + 1*0 + 1*1 + 0*0 + \\ 0*1 + 0*1 + 1*1 + 0*0 + 0*1 + 0*0 + 0*1 + 0*0 = 0$$

$$0*1 + 1*1 + 1*0 + 1*0 + 1*1 + 0*0 + 0*1 + 1*0 + \\ 0*1 + 0*1 + 0*1 + 1*0 + 0*1 + 0*0 + 0*1 + 0*0 = 0$$

$$1*1 + 0*1 + 1*0 + 1*0 + 0*1 + 1*0 + 0*1 + 0*0 +$$

-continued $0*1+0*1+0*1+0*0+1*1+0*0+0*1+0*0=0$ $0*1+1*1+1*0+0*0+1*1+1*0+0*1+0*0+$
$\quad 0*1+0*1+0*1+0*0+0*1+1*0+0*1+0*0=0$ $0*1+0*1+0*0+0*0+0*1+0*0+1*1+0*0+$
$\quad 0*1+0*1+0*1+0*0+0*1+0*0+1*1+0*0=0$ $0*1+0*1+0*0+0*0+0*1+0*0+0*1+1*0+$
$\quad 0*1+0*1+0*1+0*0+0*1+0*0+0*1+1*0=0$ When the value of the syndromes S0 to S7 are all 0, it may indicate that the read data DATA' has no error. When the values of the syndromes S0 to S7 are all 0, the error correction code decoder 120 may determine that the data DATA' has no error and output the data DATA' as is (DATA'=DATA).

FIG. 7 is a diagram illustrating how the error correction code decoder 120 generates the syndromes S0 to S7 when the data DATA' has an error in accordance with an embodiment of the present disclosure. In FIG. 7, after the data DATA (1,1,0,0,1,0,1,0) illustrated in FIG. 4 and the error correction code ECC (1,1,1,0,1,0,1,0) are stored in the memory core, an error is generated in the bit D6 of the data, so the data DATA' is read as (1,1,0,0,1,0,0,0), and the error correction code ECC is read as (1,1,1,0,1,0,1,0) and input to the error correction code decoder 120.

Referring to FIG. 7, it can be seen that the syndromes S0 to S7 are generated as (1,0,1,0,0,0,1,0) by matrix multiplying the check matrix in FIG. 2 by read data DATA' (1,1,0, 0,1,0,0,0)/error correction code ECC (1,1,1,0,1,0,1,0).

The generation of FIG. 7 may be expressed with the following formulas.

$1*1+0*1+1*0+0*0+1*1+0*0+1*0+0*0+$
$\quad 1*1+0*1+0*1+0*0+0*1+0*0+0*1+0*0=1$ $0*1+1*1+0*0+1*0+0*1+1*0+0*0+1*0+$
$\quad 0*1+1*1+0*1+0*0+0*1+0*0+0*1+0*0=0$ $1*1+0*1+0*0+1*0+1*1+1*0+1*0+0*0+$
$\quad 0*1+0*1+1*1+0*0+0*1+0*0+0*1+0*0=1$ $0*1+1*1+1*0+1*0+1*1+0*0+0*0+1*0+$
$\quad 0*1+0*1+0*1+1*0+0*1+0*0+0*1+0*0=0$ $1*1+0*1+1*0+1*0+0*1+1*0+0*0+0*0+$
$\quad 0*1+0*1+0*1+0*0+1*1+0*0+0*1+0*0=0$ $0*1+1*1+1*0+0*0+1*1+1*0+0*0+0*0+$
$\quad 0*1+0*1+0*1+0*0+0*1+1*0+0*1+0*0=0$ $0*1+0*1+0*0+0*0+0*1+0*0+1*0+0*0+$
$\quad 0*1+0*1+0*1+0*0+0*1+0*0+1*1+0*0=1$ $0*1+0*1+0*0+0*0+0*1+0*0+0*0+1*0+$
$\quad 0*1+0*1+0*1+0*0+0*1+0*0+0*1+1*0=0$ The value (1,0,1,0,0,0,1,0) of the syndromes S0 to S7 indicates the location of an error. With reference to the column vectors of the check matrix in FIG. 2, a column vector with a value of (1,0,1,0,0,0,1,0) is a column vector corresponding to D6. Thus, the error correction code decoder 120 may determine that D6 has an error and correct the error by inverting a value of D6 from 0 to 1. Due to such an error correction, the data DATA output from the error correction code decoder 120 may be (0,1,0,0,1,0,1,0). That is, an error in the data DATA' input to the error correction code decoder 120 may be corrected and error-corrected data DATA may be generated.

Figure 8:
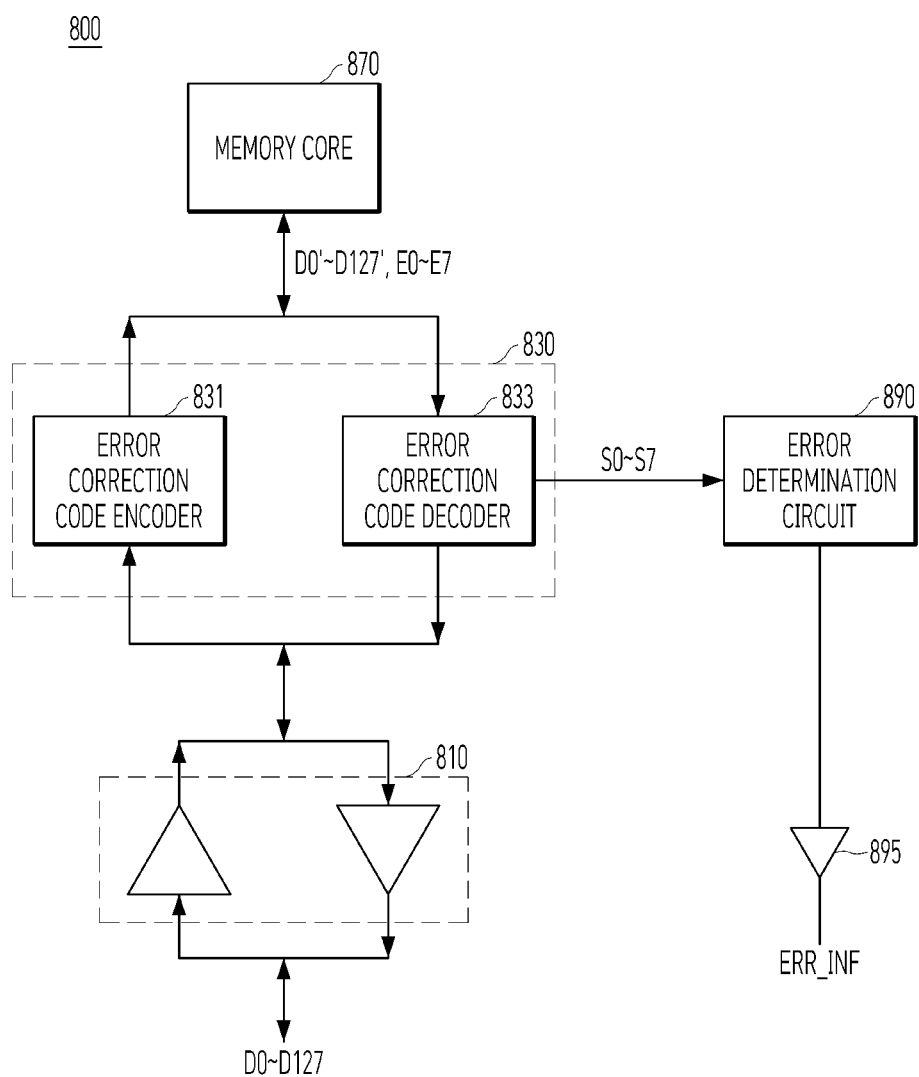
FIG. 8 is a configuration diagram of a memory in accordance with an embodiment of the present disclosure.

FIG. 8 is a configuration diagram of a memory 800 in accordance with an embodiment of the present disclosure.

Referring to FIG. 8, the memory 800 may include a data transmission/reception circuit 810, an ECC engine 830, a memory core 870, an error determination circuit 890, and an error information transmission circuit 895.

The data transmission/reception circuit 810 may transmit and/or receive data DATA. The data transmission/reception circuit 810 may receive the data DATA transmitted from the memory controller during a write operation. Further, the data transmission/reception circuit 810 may transmit the data DATA to the memory controller during a read operation. FIG. 8 illustrates that the number of bits of the data DATA transmitted and received by the data transmission/reception circuit 810 during a one-time write and read operation is 128 bits (D0 to D127).

The ECC engine 830 may include an error correction code encoder 831 and an error correction code decoder 833. During the write operation, the error correction code encoder 831 may generate the 8-bit error correction code E0 to E7 by using the 128-bit data D0 to D127 received through the data transmission/reception circuit 810. The error correction code E0 to E7 is generated by the error correction code encoder 831 and no error correction operation is performed. Thus, the data D0 to D127 input to the ECC engine 830 and data D0' to D127' output from the ECC engine 830 may be the same.

The error correction code decoder 833 may correct an error in the data D0' to D127' from the memory core 870 by using the error correction code E0 to E7 from the memory core 870. Correcting an error may mean detecting an error in the data D0' to D127' by using the error correction code E0 to E7 and/or correcting the error if the error is detected. The error correction code decoder 833 may generate the syndromes S0 to S7 in the error correction process. The syndromes S0 to S7 may be transmitted to the error determination circuit 890. The data D0 to D127 error-corrected by the error correction code decoder 833 may be transmitted to the memory controller through the data transmission/reception circuit 810.

The ECC engine 830 may be able to correct a 1 bit error occurring in the data D0 to D127 and a 2 bit error occurring in adjacent bits in the data D0 to D127. For example, when an error occurs in 1 bit (D83) among the 128 bit data D0 to D127, the ECC engine 830 may correct the error. When a 2 bit error occurs in two adjacent bits (D4 and D5) among the 128 bit data D0 to D127, the ECC engine 830 may correct the error.

The memory core 870 may include a cell array including memory cells arranged between a plurality of rows and a plurality of columns, a row decoder for activating and deactivating rows of the cell array, a column decoder for inputting and outputting data to/from the cell array, an input/output circuit, and the like. During a write operation, the 128 bit data D0' to D127' and the 8 bit error correction code E0 to E7 may be stored in the memory core 870. During a read operation, the 128 bit data D0' to D127' and the 8 bit error correction code E0 to E7 may be read from the memory core 870.

The error determination circuit 890 may determine an error in the data D0' to D127' by using the syndromes S0 to S7 and generate error information ERR_INF. The error information ERR_INF may include information indicating whether the data includes errors and how many errors the data includes. That is, the error determination circuit 890 may include a circuit that is not involved in the error correction operation of the error correction code decoder 833 and generates error information ERR_INF by using the syndromes S0 to S7 generated during the error correction operation of the error correction code decoder 833. The error information ERR_INF may indicate whether an error has occurred in the data D0 to D127 and whether the error is a correctable error or an uncorrectable error. The error information ERR_INF may be transmitted to the memory controller through the error information transmission circuit 895 during each read operation. The error information ERR_INF may be output through a pad of the memory 800 that is not used during a read operation. For example, a data mask inversion (DMI) pad of the memory 800 is not used during a read operation, and the error information transmission circuit 895 may transmit the error information ERR_INF through the DMI pad.

The configuration of the check matrix and the error determination method of the error determination circuit 890 may be simple and fast as described below.

Figure 9:
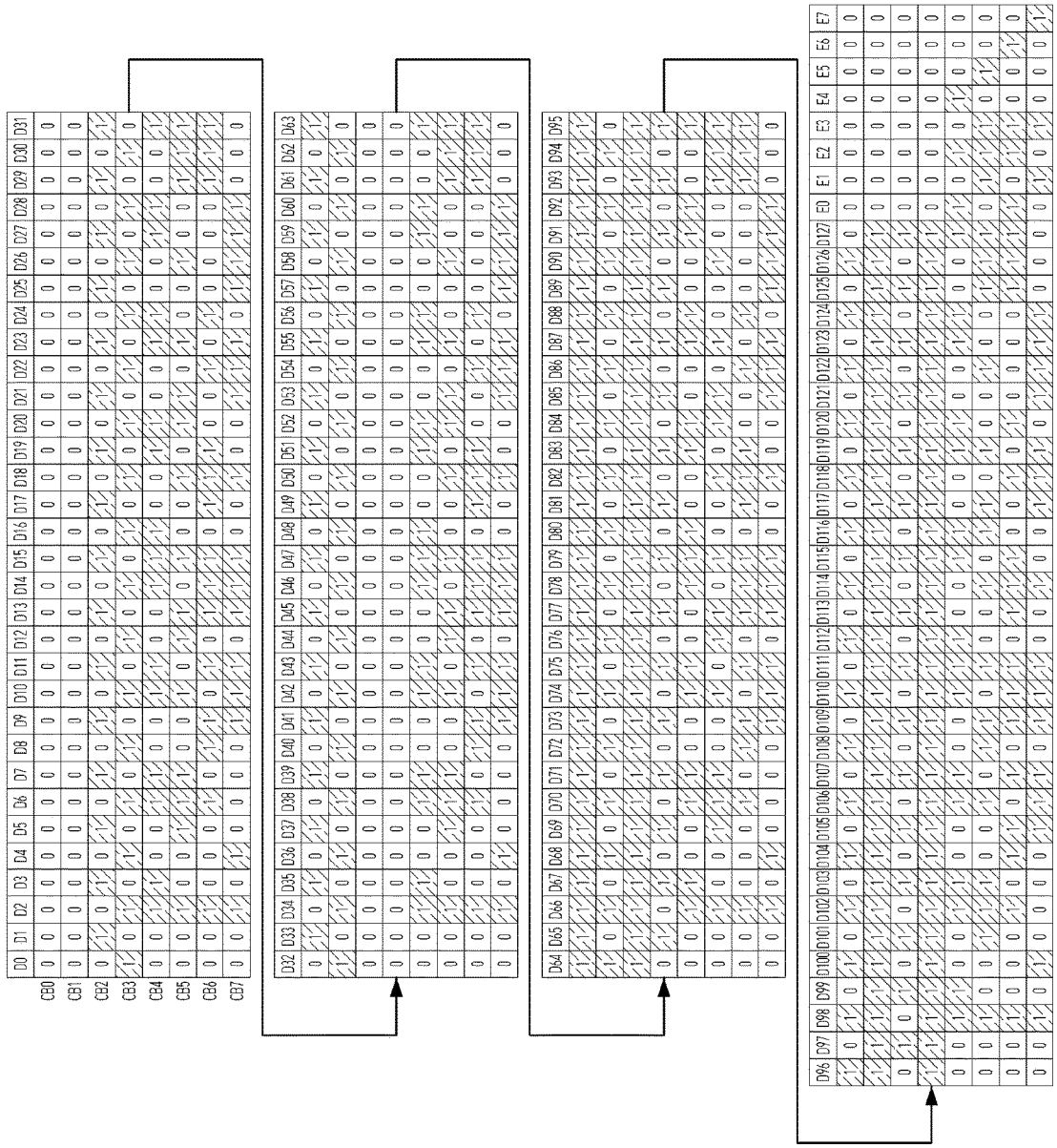
FIG. 9 is a diagram illustrating a check matrix used by an error correction code encoder and an error correction code decoder of an ECC engine in FIG. 8 in accordance with an embodiment of the present disclosure.

FIG. 9 is a diagram illustrating a check matrix used by the error correction code encoder 831 and the error correction code decoder 833 of the ECC engine 830 in FIG. 8 in accordance with an embodiment of the present disclosure.

The check matrix may include a matrix of (number of bits of error correction code)×(number of bits of error correction code+number of bits of data). Because the error correction code E0 to E7 includes 8 bits and the data D0 to D127 includes 128 bits, the check matrix may include an 8×136 matrix (=8×(8+128) matrix). Hereinafter, in the check matrix, a portion corresponding to CB0 to CB3 is referred to as an upper index, and a portion corresponding to CB4 to CB7 is referred as a lower index.

Referring to FIG. 9, it can be seen that all column vectors of the upper index portion of the data D0 to D127 in the check matrix have odd weights. It can be seen that the column vector of the upper index portion of the data D0 is '0001', which has an odd weight with an odd number of 1s. The column vector of the upper index portion of the data D65 is '1011', which has an odd weight with an odd number of 1's.

In a case where the ECC engine 830 uses the check matrix as illustrated in FIG. 9, the upper index portions S0 to S3 of the syndromes S0 to S7 are generated as '0100' when an error occurs in the data D36', and the upper index portions of the syndrome S0 to S3 are generated as '1110' when an error occurs in the data D64'.

Figure 10:
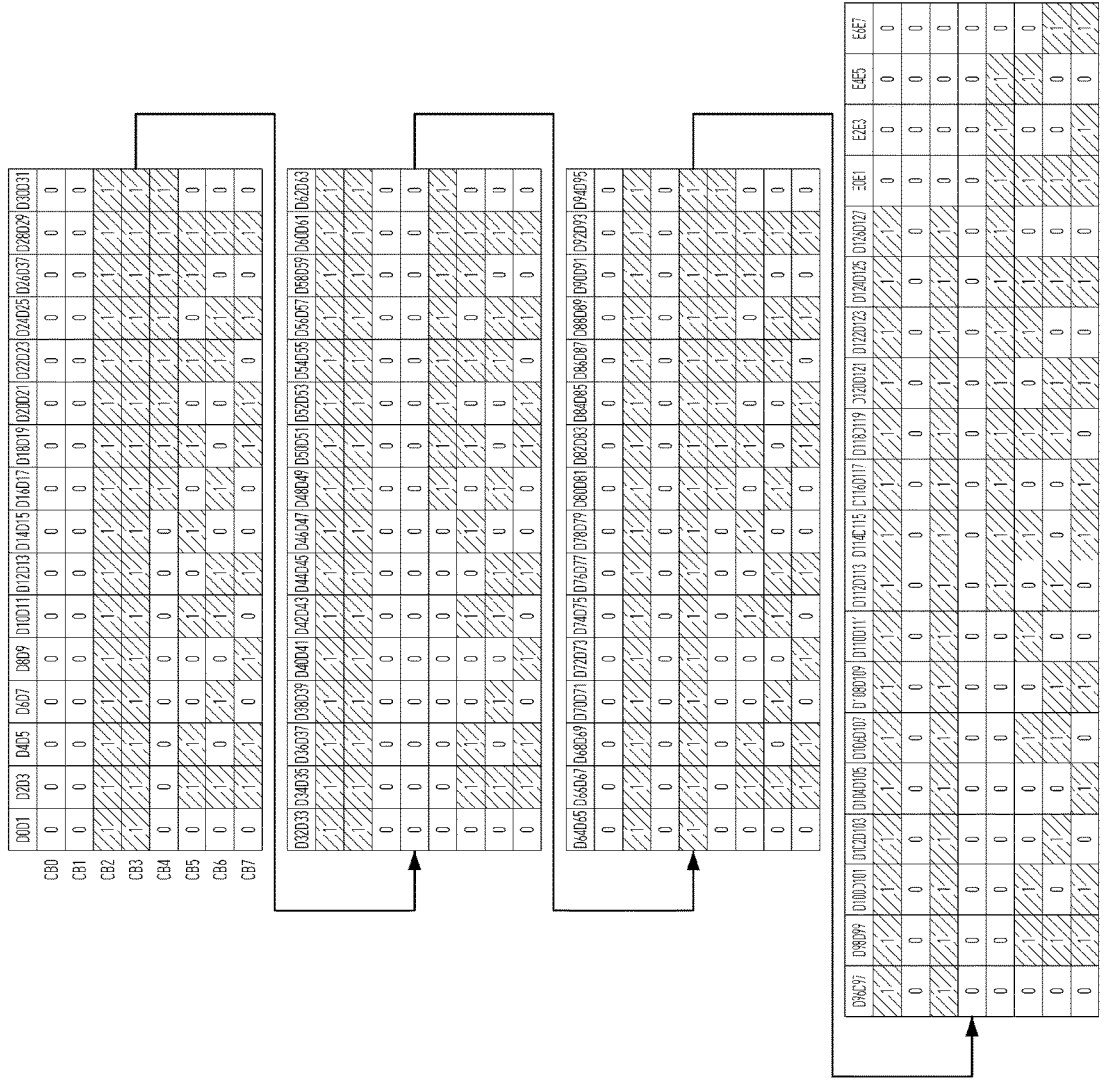
FIG. 10 is a matrix in which columns of the check matrix in FIG. 9 are reduced to 2:1 in accordance with an embodiment of the present disclosure.

FIG. 10 is a matrix in which the columns of the check matrix in FIG. 9 are reduced to 2:1 in accordance with an embodiment of the present disclosure.

The matrix in FIG. 10 may be the sum of column vectors of adjacent data in FIG. 9. For example, the column vector '00110000' of D0D1 in FIG. 10 may be the sum of the column vector '00010000' of D0 and the column vector '00100000' of D1 in FIG. 9. The column vector '01010111' of D66D67 in FIG. 10 may be the sum of the column vector '11101111' of D66 and the column vector '10111000' of D67 in FIG. 9.

Referring to FIG. 10, in a case where the ECC engine 830 uses the check matrix as illustrated in FIG. 9, it can be seen that the upper index portions S0 to S3 of the syndromes S0 to S7 are generated as '0011' that is the same as D4D5 in the matrix in FIG. 10 when an error occurs in adjacent 2-bit data D4' and D5'. Further, the upper index portions S0 to S3 of the syndromes S0 to S7 are generated as '1100' that is the same as D34D35 in the matrix in FIG. 10 when an error occurs in adjacent 2-bit data D34' and D35'. It can also be seen that the upper index portions S0 to S3 of the syndromes S0 to S7 are generated as '0101' that is the same as D66D67 in the matrix in FIG. 10 when an error occurs in adjacent 2-bit data D66' and D67'. Further, the upper index portions S0 to S3 of the syndromes S0 to S7 are generated as '1010' that is the same as D104D105 in the matrix in FIG. 10 when an error occurs in adjacent 2-bit data D104' and D105'.

FIG. 11 is a diagram illustrating the operation of the error determination circuit 890 of FIG. 8 when the ECC engine 830 uses the check matrix in FIG. 9 in accordance with an embodiment of the present disclosure.

When the ECC engine 830 uses the check matrix in FIG. 9, the error determination circuit 890 may determine the occurrence of an error by using only the upper index portions S0 to S3 of the syndromes S0 to S7.

When S0 to S3 are '0000', the error determination circuit 890 may determine that the data D0' to D127' have no error. In such a case, the error determination circuit 890 may generate the error information ERR_INF as No Error (NE) indicating that there is no error.

When S0 to S3 are odd weights, that is, when the number of 1's in S0 to S3 are odd, the error determination circuit 890 may determine that a 1 bit error has occurred in the data D0' to D127'. Because all column vectors of the upper index portion of the data D0 to D127 in the check matrix in FIG. 9 have odd weights, such a determination may be possible.

When S0 to S3 are one of '0011', '1100', '0101', and '1010', the error determination circuit 890 may determine that an error has occurred in two adjacent bits of the data D0' to D127'. It can be seen that '0011', '1100', '0101', and '1010' are the same as the values of the upper index portion of the data in the matrix in FIG. 10.

When the error determination circuit 890 determines that a 1 bit error exists in the data and when the error determination circuit 890 determines that an error has occurred in two adjacent bits in the data, the error determination circuit 890 may generate the error information ERR_INF as Correctable Error (CE) indicating the occurrence of a correctable error.

When S0 to S3 have different values from the previously mentioned cases, because it means that an error has occurred in the data D0' to D127' and the error is not correctable, the error determination circuit 890 may determine that an uncorrectable error has occurred in the data D0' to D127'. Subsequently, the error determination circuit 890 may generate the error information ERR_INF as Uncorrectable Error (UE) indicating the occurrence of an uncorrectable error.

When the ECC engine 830 uses the check matrix in FIG. 9, there may be an advantage in that the error determination circuit 890 may be able to determine an error by using only the upper index portion of the syndrome. When the form of the error correction code E0 to E7 in the check matrix is an identity matrix, an operation of the ECC engine 830 may be simpler. However, in the check matrix in FIG. 9, because the form of the error correction code E0 to E7 portion is not the form of the identity matrix, the operation of the ECC engine 830 may be difficult to simplify and may become more complicated.

A check matrix, which makes the error determination of the error determination circuit 890 more complicated, but makes it possible to simplify the operation of the ECC engine, is described below.

Figure 12:
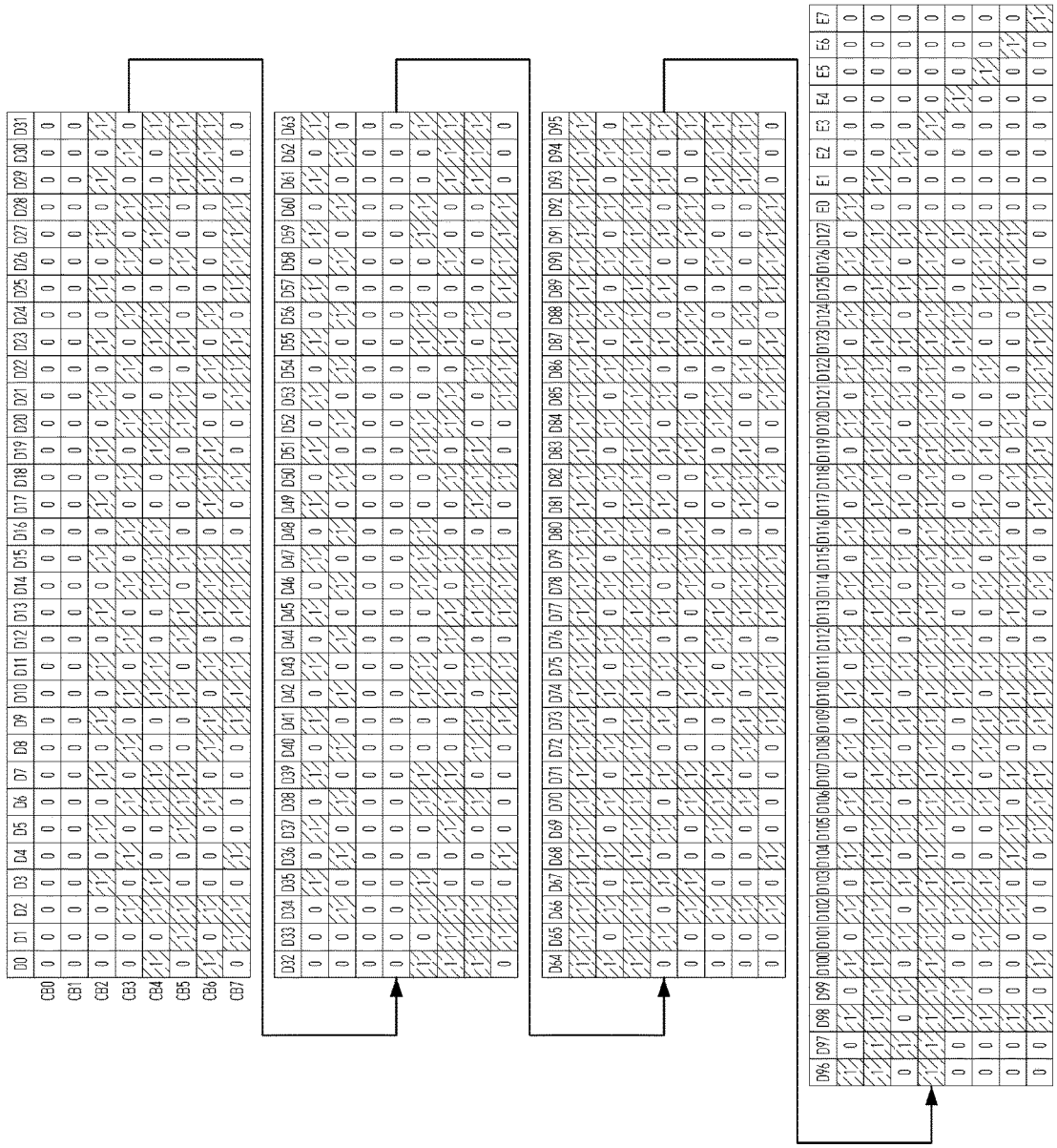
FIG. 12 is a diagram illustrating another check matrix used by the error correction code encoder and the error correction code decoder of the ECC engine in FIG. 8 in accordance with an embodiment of the present disclosure.

FIG. 12 is a diagram illustrating another check matrix used by the error correction code encoder 831 and the error correction code decoder 833 of the ECC engine 830 in FIG. 8 in accordance with an embodiment of the present disclosure.

Referring to FIG. 12, it can be seen that most of the column vectors of the upper index portion CB0 to CB3 of the data D0 to D127 in the check matrix have odd weights, but the column vectors of some data do not have odd weights and have even weights. That is, the column vectors of the upper index of the data D2 to D31 and D34 to D127 have odd weights, but the column vectors of the upper index of the data D0, D1, D32, and D33 have even weights of '0000'.

It can be seen that by allowing the column vectors of the upper index of the data D0, D1, D32, and D33 to have even weights, the error correction code E0 to E7 portion of the check matrix in FIG. 12 has the form of the identity matrix. When the error correction code E0 to E7 portion in the check matrix has the form of the identity matrix, the operation of the ECC engine 830 may be more simpler.

The check matrix in FIG. 12 may be configured so that the error correction code E0 to E7 portion has the form of the identity matrix and the column vectors of the upper index of the data D0 to D127 have maximum odd weights.

Figure 13:
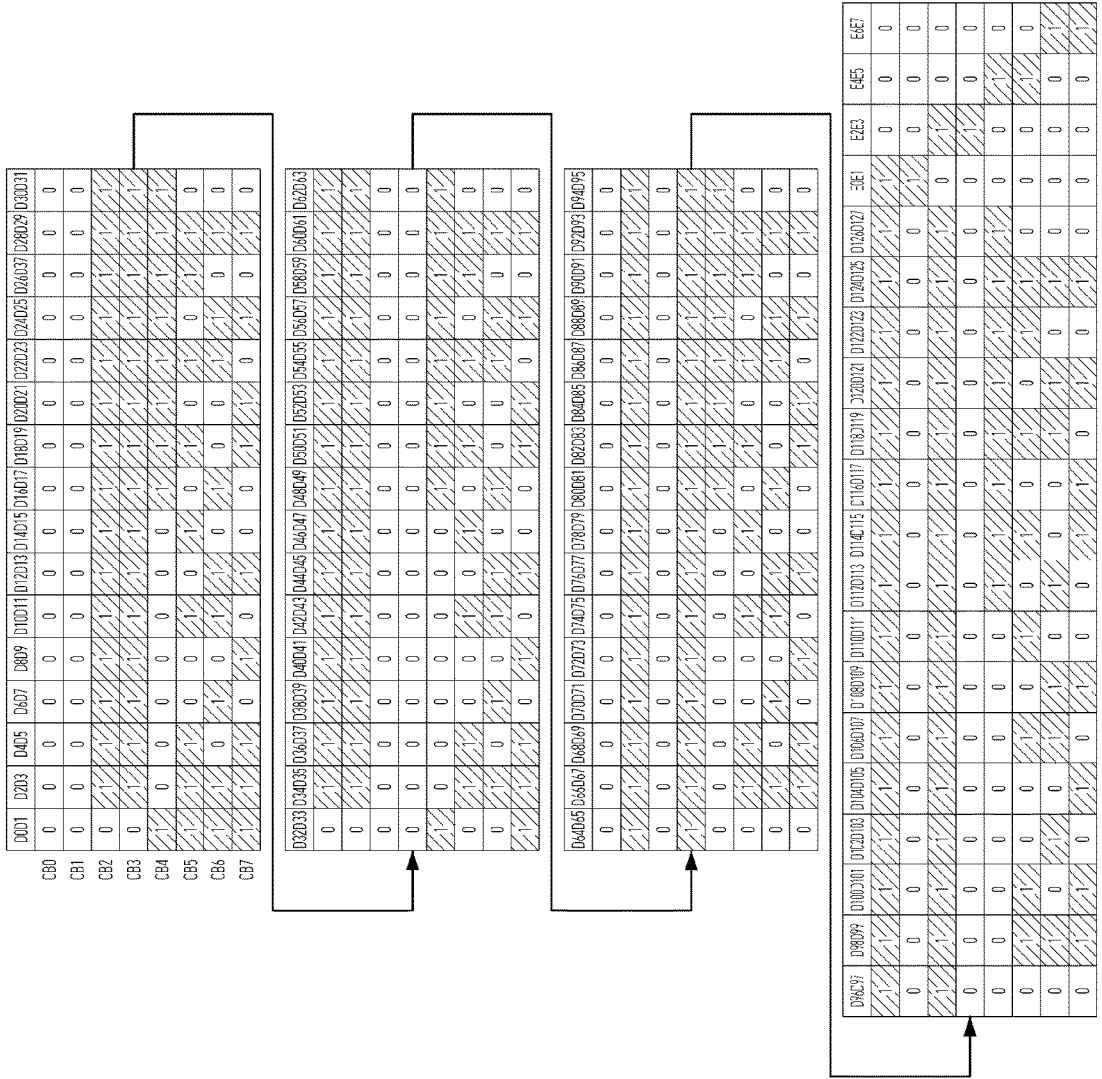
FIG. 13 is a matrix in which columns of the check matrix in FIG. 12 are reduced to 2:1 in accordance with an embodiment of the present disclosure.

FIG. 13 is a matrix in which the columns of the check matrix in FIG. 12 are reduced to 2:1 in accordance with an embodiment of the present disclosure.

The matrix in FIG. 13 may be the sum of column vectors of adjacent data in FIG. 12. For example, the column vector '00001111' of D0D1 in FIG. 13 may be the sum of the column vector '00001010' of D0 and the column vector '00000101' of D1 in FIG. 12. The column vector '01010111' of column vector D66D67 in FIG. 13 may be the sum of the column vector '11101111' of D66 and the column vector '10111000' of D67 in FIG. 12.

Referring to FIGS. 12 and 13, because the column vectors of the upper index of the data D2 to D31 and D34 to D127 are the same as those of FIGS. 9 and 10, the error determination of the data D2' to D31' and D34' to D127' may be performed in the same way as in FIG. 11. That is, when the upper index portions S0 to S3 of the syndromes S0 to S7 are '0000', it may be determined that no error exists in at least the data D2' to D31' and D34' to D127'. When the upper index portions S0 to S3 have odd weights, it may be determined that a 1 bit error has occurred in the data D2' to D31' and D34' to D127'. When the upper index portions S0 to S3 of the syndromes S0 to S7 have one of the values of '0011', '1100, '0101', or '1010', it may be determined that an error has occurred in two adjacent bits in the data D2' to D31' and D34' to D127'.

However, in the check matrix in FIG. 12, because the column vectors of the upper index of the data D0, D1, D32, and D33 do not have odd weights, when an error occurs in data D0, D1, D32, and D33, it is difficult to simply determine the error by checking only the upper index portions S0 to S3 of the syndromes S0 to S7 as described above.

FIG. 14 is a diagram illustrating the operation of the error determination circuit 890 of FIG. 8 when the ECC engine 830 uses the check matrix in FIG. 12 in accordance with an embodiment of the present disclosure.

In the check matrix in FIG. 12, all column vectors of the upper index of the data D0 to D127 do not have odd weights, and the column vectors of the upper index of the data D0, D1, D32, and D33 have even weights. Therefore, the error determination circuit 890 needs to use not only the upper index portions S0 to S3 of the syndromes S0 to S7 but also the lower index portions S4 to S7 of the syndromes S0 to S7.

The error determination circuit 890 may determine that the data D0' to D127' have no error when S0 to S7 are '00000000'. In such a case, the error determination circuit 890 may generate the error information ERR_INF as No Error (NE) indicating the absence of an error.

When S0 to S3 are odd weights, that is, when the number of 1's in S0 to S3 are odd, the error determination circuit 890 may determine that a 1 bit error has occurred in the data D2' to D31' and D34' to D127'. In order to determine that a 1 bit error has occurred in the data D2' to D31' and D34' to D127', only S0 to S3 are used, and S4 to S7 might not be used.

When S0 to S7 are one of '00001010', '00000101', '00001110', and '00000111', the error determination circuit 890 may determine that a 1 bit error has occurred in the data D0', D1', D32', and D33'.

When S0 to S3 are one of '0011', '1100', '0101', and '1010', the error determination circuit 890 may determine that an error has occurred in two adjacent bits in the data D2' to D31' and D34' to D127'. It can be seen that '0011', '1100', '0101', and '1010' are the same as the values of the upper index portion of the data D2' to D31' and D34' to D127' in the matrix in FIG. 13. In order to determine that an error has occurred in two adjacent bits in the data D2' to D31' and D34' to D127', only S0 to S3 are used, and S4 to S7 might not be used.

When S0 to S7 are one of '00001111' and '00001001', the error determination circuit 890 may determine that an error has occurred in two adjacent bits in the data D0', D1', D32', and D33'.

When the error determination circuit 890 determines that a 1 bit error has occurred in the data D0' to D127' and when the error determination circuit 890 determines that an error has occurred in two adjacent bits, the error determination circuit 890 may generate the error information ERR_INF as Correctable Error (CE) indicating the occurrence of a correctable error.

When S0 to S7 have different values from the previously mentioned cases, because it means that an error has occurred in the data D0' to D127' and the error is not correctable, the error determination circuit 890 may determine that an uncorrectable error has occurred in the data D0' to D127'. Subsequently, the error determination circuit 890 may generate the error information ERR_INF as Uncorrectable Error (UE) indicating the occurrence of an uncorrectable error.

Figure 15:
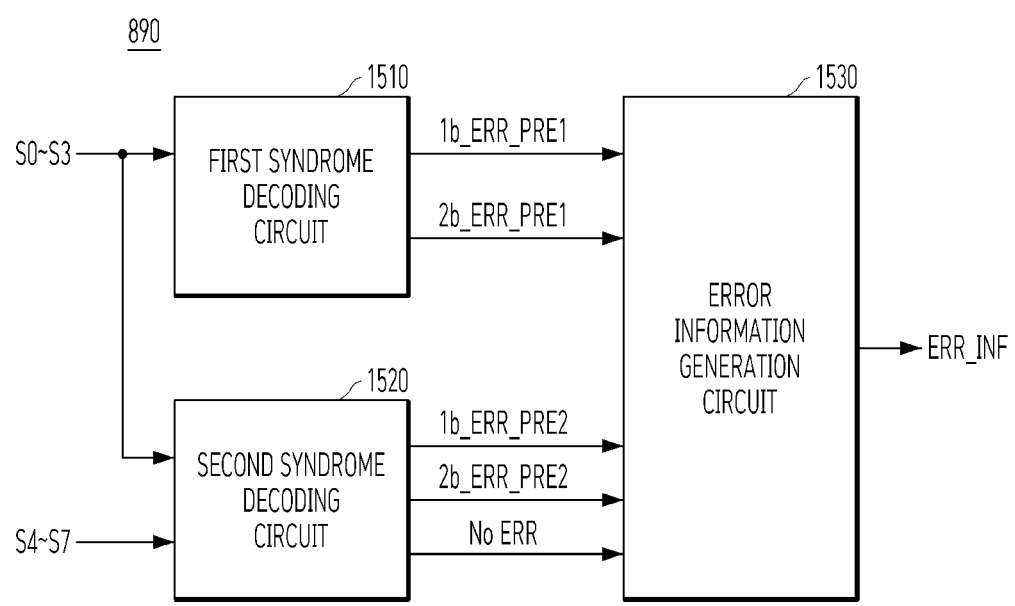
FIG. 15 is a configuration diagram of an error determination circuit operating as illustrated in FIG. 14 in accordance with an embodiment of the present disclosure.

FIG. 15 is a configuration diagram of an error determination circuit 890 operating as illustrated in FIG. 14 in accordance with an embodiment of the present disclosure.

Referring to FIG. 15, the error determination circuit 890 may include a first syndrome decoding circuit 1510, a second syndrome decoding circuit 1520, and an error information generation circuit 1530.

The first syndrome decoding circuit 1510 may generate a first preliminary 1 bit error signal 1b_ERR_PRE1 and a first preliminary 2 bit error signal 2b_ERR_PRE1 by decoding the upper index portions S0 to S3 of the syndromes S0 to S7. When S0 to S3 have odd weights, the first syndrome decoding circuit 1510 may activate the first preliminary 1 bit error signal 1b_ERR_PRE1. When S0 to S3 are one of '0011', '1100', '0101', and '1010' as shown in FIG. 14, the first syndrome decoding circuit 1510 may activate the first preliminary 2 bit error signal 2b_ERR_PRE1. It can be said that the first syndrome decoding circuit 1510 determines a case where a 1 bit error has occurred in the data D2' to D31', D34' to D127' and a case where an error has occurred in two adjacent bits in the data D2' to D31', D34' to D127'.

The second syndrome decoding circuit 1520 may generate a second preliminary 1 bit error signal 1b_ERR_PRE2, a second preliminary 2 bit error signal 2b_ERR_PRE2, and a no error signal No ERR by decoding the syndromes S0 to S7. When the syndromes S0 to S7 are one of '00001010', '00000101', '00001110', and '00000111' as shown in FIG. 14, the second syndrome decoding circuit 1520 may activate the second preliminary 1 bit error signal 1b_ERR_PRE2. When the syndromes S0 to S7 are one of '00001111' and '00001001' as shown in FIG. 14, the second syndrome decoding circuit 1520 may activate the second preliminary 2 bit error signal 2b_ERR_PRE2. When the syndromes S0 to S7 are '00000000' as shown in FIG. 14, the second syndrome decoding circuit 1520 may generate the no error signal No ERR.

The error information generation circuit 1530 may generate the error information as 'No Error' (ERR_INF=NE) when the no error signal No ERR is activated. The error information generation circuit 1530 may generate the error information as 'Correctable Error' (ERR_INF=CE) when one or more of the first preliminary 1 bit error signal 1b_ERR_PRE1, the second preliminary 1 bit error signal 1b_ERR_PRE2, the first preliminary 2 bit error signal 2b_ERR_PRE1, and the second preliminary 2 bit error signal 2b_ERR_PRE2 are activated. The error information generation circuit 1530 may generate the error information as 'Uncorrectable Error' (ERR_INF=UE) when the no error signal No ERR, the first preliminary 1 bit error signal 1b_ERR_PRE1, the second preliminary 1 bit error signal 1b_ERR_PRE2, the first preliminary 2 bit error signal 2b_ERR_PRE1, and the second preliminary 2 bit error signal 2b_ERR_PRE2 are all deactivated.

Although embodiments according to the technical idea of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure. Furthermore, the embodiments may be combined to form additional embodiments.

What is claimed is:

1. A memory comprising:
   a memory core;
   an error correction code (ECC) engine configured to generate an error correction code to be stored in the memory core together with write data by using the write data during an encoding operation, and to correct an error of read data read from the memory core using the error correction code read from the memory core during a decoding operation, wherein the ECC engine generates syndromes, each including upper index portions and lower index portions; and
   an error determination circuit configured to determine that during the decoding operation, a 1-bit error exists when the upper index portions of the syndromes generated by the ECC engine have odd weights, and to determine that a correctable 2-bit error exists when the upper index portions of the syndromes are one of predetermined even weight patterns.

2. The memory of claim 1, wherein the ECC engine performs the encoding operation and the decoding operation by using a check matrix,
   wherein all upper index portions corresponding to data in the check matrix have odd weights, and
   wherein an exclusive OR of upper index portions of an adjacent data pair in the check matrix has one of the predetermined even weight patterns.

3. The memory of claim 1, wherein the error determination circuit generates error information by using results of the determinations, and
   wherein the error information is transmitted to a memory controller.

4. The memory of claim 1, wherein, when all upper index portions of the syndromes are zero (0), the error determination circuit determines that no error exists.

5. The memory of claim 1,
   wherein the upper index portions are upper bits of the syndromes and the lower index portions are lower bits of the syndromes.

6. A memory comprising:
   a memory core;
   an error correction code (ECC) engine configured to generate an error correction code to be stored in the memory core together with write data by using the write data during an encoding operation, and to correct an error of read data read from the memory core using the error correction code read from the memory core during a decoding operation, wherein the ECC engine generates syndromes, each including upper index portions and lower index portions; and
   an error determination circuit configured to determine that during the decoding operation, a 1-bit error exists when the upper index portions of the syndromes generated by the ECC engine have odd weights, and to determine that a 1-bit error exists when the upper index portions of the syndromes have specific even weights and lower index portions coincide with one of predetermined first patterns,
   wherein, during the decoding operation, the error determination circuit determines that a correctable 2-bit error exists when the upper index portions of the syndromes have even weights coinciding with one of predetermined second patterns, and determines that a correctable 2-bit error exists when the upper index portions of the syndromes are a predetermined third pattern and the lower index portions coincide with one of predetermined fourth patterns.

7. The memory of claim 6, wherein the ECC engine performs the encoding operation and the decoding operation by using a check matrix, and
   wherein 90% or more of upper index portions corresponding to data in the check matrix have odd weights and the remainder of the check matrix has the specific even weight.

8. The memory of claim 6, wherein the error determination circuit generates error information by using results of the determinations, and
   wherein the error information is transmitted to a memory controller.

9. The memory of claim 6, wherein, when all upper index portions and all lower index portions of the syndromes are zero (0), the error determination circuit determines that no error exists.

10. The memory of claim 6, wherein the upper index portions are upper bits of the syndromes and the lower index portions are lower bits of the syndromes.

11. The memory of claim 6, wherein the error determination circuit comprises:
  a first syndrome decoding circuit configured to generate a first preliminary 1-bit error signal and a first preliminary 2-bit error signal by decoding the upper index portions of the syndromes;
  a second syndrome decoding circuit configured to generate a second preliminary 1-bit error signal, a second preliminary 2-bit error signal, and a no error signal by decoding the upper index portions of the syndrome and the lower index portions of the syndromes; and
  an error information generation circuit configured to generate the error information indicating 'no error' when the no error signal is activated, to generate the error information indicating 'correctable error' when one or more of the first preliminary 1-bit error signal, the second preliminary 1-bit error signal, the first preliminary 2-bit error signal, and the second preliminary 2-bit error signal are activated, and to generate the error information indicating 'uncorrectable error' when the no error signal, the first preliminary 1-bit error signal, the second preliminary 1-bit error signal, the first preliminary 2-bit error signal, and the second preliminary 2-bit error signal are all deactivated.

12. A memory comprising:
  a memory core;
  an error correction code (ECC) engine configured to perform an encoding operation and a decoding operation; and
  an error determination circuit,
  wherein the ECC engine is configured to:
  during the encoding operation,
    receive write data;
    generate an error correction code using the write data; and
    provide the memory core with the write data and the error correction code for storing,
  during the decoding operation,
    read, from the memory core, read data and the error correction code;
    decode the read data using the error correction code; and
    generate syndrome values for the decoded read data, the syndrome values including an upper portion and a lower portion, and
  wherein the error determination circuit is configured to:
  determine whether the decoded read data includes a 1-bit error or a 2-bit error, based on a combination of bit patterns and bit weights of the upper and lower portions of the syndrome values,
  wherein the error determination circuit determines that the decoded read data includes the 1-bit error when bits of the upper portion of the syndrome values have a pattern (0000) and bits of the lower portion of the syndrome values have one of patterns (1010), (0101), (1110), (0111).

13. The memory of claim 12, wherein the error determination circuit determines that the decoded read data includes the 1-bit error when weights of bits of the upper portion of the syndrome values are odd.

14. The memory of claim 12, wherein the error determination circuit determines that the decoded read data includes the 2-bit error when bits of the upper portion of the syndrome values have one of patterns (0011), (1100), (0101), (1010).

15. The memory of claim 12, wherein the error determination circuit determines that the decoded read data includes the 2-bit error when bits of the upper portion of the syndrome values have a pattern (0000) and bits of the lower portion of the syndrome values have one of patterns (1111), (1001).

16. The memory of claim 12, wherein the error determination circuit generates error information based on the determination and transmits the error information to a memory controller.

* * * * *